United States Patent
Matsui et al.

(10) Patent No.: US 11,659,226 B2
(45) Date of Patent: *May 23, 2023

(54) CONTENT DISPLAY SYSTEM, CONTENT DISPLAY METHOD, AND RECORDING MEDIUM WITH CONTENT DISPLAYING PROGRAM RECORDED THEREON

(71) Applicant: SHARP KABUSHIKI KAISHA, Sakai (JP)

(72) Inventors: Kaname Matsui, Sakai (JP); Masafumi Okigami, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/859,663

(22) Filed: Jul. 7, 2022

(65) Prior Publication Data

US 2022/0345766 A1    Oct. 27, 2022

Related U.S. Application Data

(62) Division of application No. 17/512,607, filed on Oct. 27, 2021, now Pat. No. 11,425,444.

(30) Foreign Application Priority Data

Oct. 27, 2020 (JP) .............................. JP2020-179941

(51) Int. Cl.
- *H04N 21/414* (2011.01)
- *H04N 21/8352* (2011.01)
- *H04N 21/258* (2011.01)

(52) U.S. Cl.
CPC . *H04N 21/41415* (2013.01); *H04N 21/25825* (2013.01); *H04N 21/8352* (2013.01)

(58) Field of Classification Search
CPC ............. H04N 21/854; H04N 21/8352; H04N 21/47205; H04N 21/41415; H04N 21/274; H04N 21/25825; G06Q 30/0241
See application file for complete search history.

(56) References Cited

U.S. PATENT DOCUMENTS

| 5,511,000 A | 4/1996 | Kaloi et al. |
| 6,078,349 A | 6/2000 | Molloy |

(Continued)

FOREIGN PATENT DOCUMENTS

JP  5744944 B2  7/2015

OTHER PUBLICATIONS

Non-Final Rejection of U.S. Appl. No. 17/512,607 dated Mar. 14, 2022.

(Continued)

*Primary Examiner* — Michael B. Pierorazio
(74) *Attorney, Agent, or Firm* — ScienBiziP, P.C.

(57) ABSTRACT

A content display system includes a first acquisition processor that acquires first content registered on a management terminal; a first display processor that causes the display device to display the first content acquired by the first acquisition processor; a second acquisition processor that acquires second content based on an operation on a portable terminal by a user when the first content is displayed on the display device; and a second display processor that causes the display device to display the second content acquired by the second acquisition processor.

10 Claims, 20 Drawing Sheets

(56) References Cited

U.S. PATENT DOCUMENTS

| | | |
|---|---|---|
| 6,195,640 B1 | 2/2001 | Mullaly et al. |
| 6,307,526 B1 | 10/2001 | Mann |
| 6,959,450 B1 | 10/2005 | Ritter et al. |
| 8,196,064 B2 | 6/2012 | Krzyzanowski et al. |
| 8,630,897 B1 | 1/2014 | Prada Gomez et al. |
| 2002/0085843 A1 | 7/2002 | Mann |
| 2002/0141614 A1 | 10/2002 | Lin |
| 2005/0108092 A1 | 5/2005 | Campbell et al. |
| 2006/0256133 A1 | 11/2006 | Rosenberg |
| 2007/0050253 A1 | 3/2007 | Biggs et al. |
| 2007/0165964 A1 | 7/2007 | Wolf et al. |
| 2008/0022569 A1 | 1/2008 | Winn |
| 2008/0111833 A1 | 5/2008 | Thorn et al. |
| 2008/0147488 A1 | 6/2008 | Tunick et al. |
| 2010/0053555 A1 | 3/2010 | Enriquez et al. |
| 2010/0080418 A1 | 4/2010 | Ito |
| 2011/0161163 A1 | 6/2011 | Carlson et al. |
| 2011/0213664 A1 | 9/2011 | Osterhout et al. |
| 2011/0255010 A1 | 10/2011 | Sakai et al. |
| 2011/0292181 A1 | 12/2011 | Acharya et al. |
| 2011/0296452 A1 | 12/2011 | Yu et al. |
| 2012/0075168 A1 | 3/2012 | Osterhout et al. |
| 2012/0192241 A1 | 7/2012 | Cho et al. |
| 2012/0194418 A1 | 8/2012 | Osterhout et al. |
| 2012/0194419 A1 | 8/2012 | Osterhout et al. |
| 2012/0194420 A1 | 8/2012 | Osterhout et al. |
| 2012/0194549 A1 | 8/2012 | Osterhout et al. |
| 2012/0194550 A1 | 8/2012 | Osterhout et al. |
| 2012/0194551 A1 | 8/2012 | Osterhout et al. |
| 2012/0194552 A1 | 8/2012 | Osterhout et al. |
| 2012/0194553 A1 | 8/2012 | Osterhout et al. |
| 2012/0200488 A1 | 8/2012 | Osterhout et al. |
| 2012/0200499 A1 | 8/2012 | Osterhout et al. |
| 2012/0200601 A1 | 8/2012 | Osterhout et al. |
| 2012/0206322 A1 | 8/2012 | Osterhout et al. |
| 2012/0206323 A1 | 8/2012 | Osterhout et al. |
| 2012/0206334 A1 | 8/2012 | Osterhout et al. |
| 2012/0206335 A1 | 8/2012 | Osterhout et al. |
| 2012/0206485 A1 | 8/2012 | Osterhout et al. |
| 2012/0212414 A1 | 8/2012 | Osterhout et al. |
| 2012/0212484 A1 | 8/2012 | Haddick et al. |
| 2012/0212499 A1 | 8/2012 | Haddick et al. |
| 2012/0300061 A1 | 11/2012 | Osman et al. |
| 2014/0168262 A1 | 6/2014 | Forutanpour et al. |
| 2016/0066060 A1 | 3/2016 | Teller |
| 2017/0171339 A1* | 6/2017 | Cheng ............... H04N 21/6125 |
| 2018/0308080 A1* | 10/2018 | Naccache ............... H04W 4/80 |
| 2019/0034981 A1 | 1/2019 | Basra et al. |
| 2019/0304587 A1 | 10/2019 | Cantrell et al. |

OTHER PUBLICATIONS

Notice of Allowance of U.S. Appl. No. 17/512,607 dated Jun. 8, 2022.

* cited by examiner

CONTENT DISPLAY SYSTEM, CONTENT DISPLAY METHOD, AND RECORDING MEDIUM WITH CONTENT DISPLAYING PROGRAM RECORDED THEREON

INCORPORATION BY REFERENCE

This application is a divisional application of U.S. patent application Ser. No. 17/512,607, filed on Oct. 27, 2021, which is based upon and claims the benefit of priority from the corresponding Japanese Patent Application No. 2020-179941 filed on Oct. 27, 2020, the entire contents of which are incorporated herein by reference.

BACKGROUND

The disclosure relates to a content display system and a content display method for displaying content, and a recording medium with a content displaying program recorded thereon.

A content display system called digital signage which is installed in public facilities and display content such as advertisements has been known. For example, a system is known in which a portable terminal accepts a user's selection of a target product of sales promotion information to be displayed on a display device (signage display) and sends the information of the target product to a sales promotion information providing device, and the sales promotion information providing device displays sales promotion information corresponding to the target product on the display device.

In the past, in stores such as supermarkets, advertisements for products are always displayed on the display devices (displays) on the sales floor as regular program content. Here, in such a store, for example, when a time sale is to be held, there is a demand to display on the display device special program content introducing products that are subject to the time sale in place of the regular program content. However, to display such special program content, the person in charge must return to the management device (office terminal) installed in the office of the store and perform the operation to register the special program content, which requires time and effort.

SUMMARY

An object of the disclosure is to provide a content display system, a content display method, and a recording medium with a content displaying program recorded thereon, which enable simple and quick switching of content displayed on a display device.

A content display system according to an aspect of the disclosure displays a predetermined content on a display device installed at a predetermined location and includes a first acquisition processor that acquires at least one first content registered on a management terminal; a first display processor that displays the first content acquired by the first acquisition processor on the display device; a second acquisition processor that acquires a second content based on an operation on a portable terminal by a user when the first content is displayed on the display device; and a second display processor that displays the second content acquired by the second acquisition processor on the display device currently displaying the first content.

A content displaying method according to another aspect of the disclosure causes a display device installed at a predetermined location to display a predetermined content and causes one or more processors to carry out the steps of: a) acquiring a first content registered to a management terminal; b) causing the display device to display the first content acquired in the step a); c) acquiring second content based on an operation on a portable terminal by a user when the first content is displayed on the display device; and d) causing the display device displaying the first content to display the second content acquired in step c).

A non-transitory, computer-readable recording medium according to another aspect of the disclosure that holds a content displaying program causing a display device installed at a predetermined location to display predetermined content and causing one or more processors to execute the step of: a) acquiring a first content registered to a management terminal; b) causing the display device to display the first content acquired in the step a); c) acquiring second content based on an operation on a portable terminal by a user when the first content is displayed on the display device; and d) causing the display device displaying the first content to display the second content acquired in step c).

The disclosure can provide a content display system, a content display method, and a recording medium with a content displaying program recorded thereon, that enable simple and quick switching of content displayed on a display device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the disclosure will now be described with reference to the accompanying drawings. The following embodiments are examples embodying the present disclosure, and do not intend to limit the technical scope of the present disclosure.

A content display system 100 of the present embodiment is a system for displaying content on a display device (display) installed at a predetermined location. For example, the content display system 100 is applied to a system for displaying (reproducing) content (signage information) involving images and sounds, such as product information (advertisements) and messages, in various places such as stores, offices, stations, and streets. In the present embodiment, a case in which the content display system 100 is applied to a store, such as a supermarket, that sells products (foods) will be described by way of example.

Figure 1:
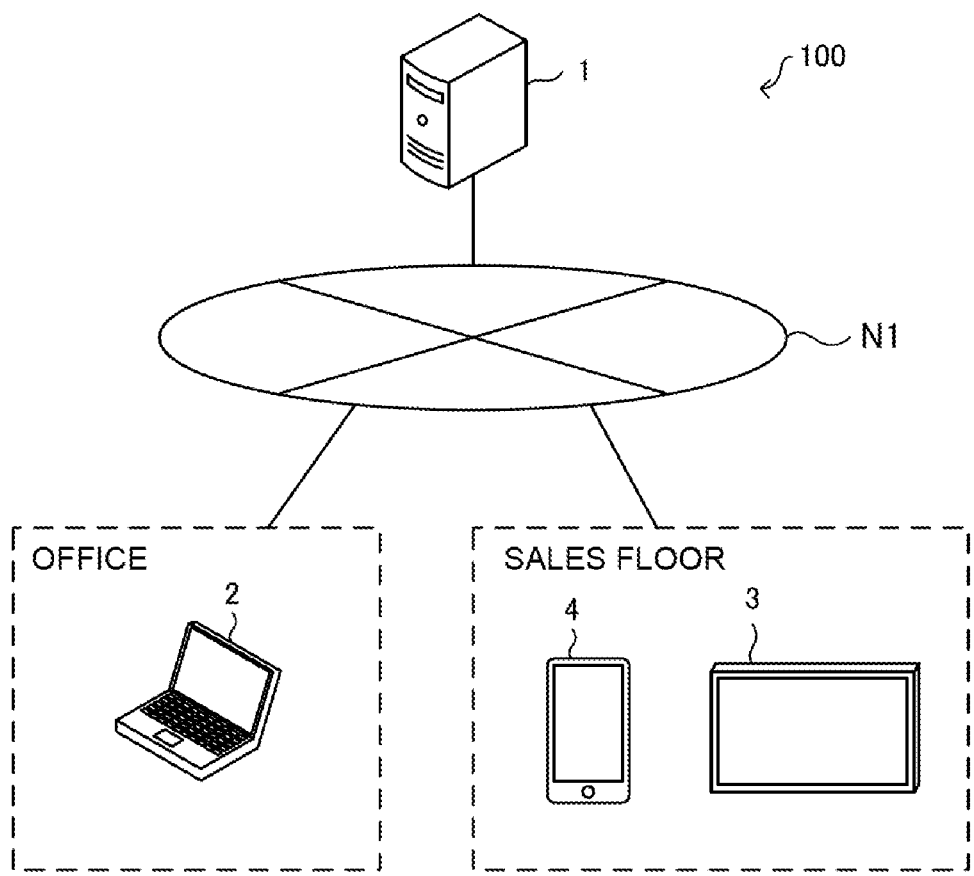
FIG. 1 is a schematic diagram illustrating a schematic configuration of a content display system according to an embodiment of the present disclosure.

FIG. 1 is a diagram illustrating a schematic configuration of a content display system 100 according to an embodiment of the present disclosure. The content display system 100 includes a management server 1, an office terminal 2, a display device 3, and a portable terminal 4. The management server 1, the office terminal 2, the display device 3, and the portable terminal 4 are communicably connected via a network N1. The network N1 is a communication network, such as the Internet. The office terminal 2 is an example of a management terminal of the disclosure, and the portable terminal 4 is an example of a portable terminal of the disclosure.

The content display system 100 may include a plurality of content display devices 3 and a plurality of portable terminals 4. The management server 1 manages the display devices 3. The office terminal 2 is equipment (e.g., a personal computer) that is disposed in an office (business office) of a store and is operated by an administrator of the store (e.g., a store manager). The portable terminal 4 is equipment (e.g., a smartphone) that is carried and operated by a staff member (e.g., an employee) of the store. One or more display devices 3 are disposed in a store (sales floor). Each staff member performs various tasks in the store (sales floor) while carrying the portable terminal 4. For example, each staff member can use the portable terminal 4 to perform general tasks such as checking product information (price, inventory, stocking status, etc.), ordering products, and checking attendance information. Each staff member or a staff member having predetermined authority can perform the task of replacing the content displayed on the display device 3 (a regular program content C1) with special program content C2. The regular program content C1 is an example of first content of the disclosure, and the special program content C2 is an example of second content of the disclosure.

The management server 1 provides a content distribution service that distributes and displays content to the display device 3. Specifically, the management server 1 executes a content distribution application program to perform a content distribution process. A specific configuration of the content display system 100 will now be described.

Management Server 1

Figure 2:
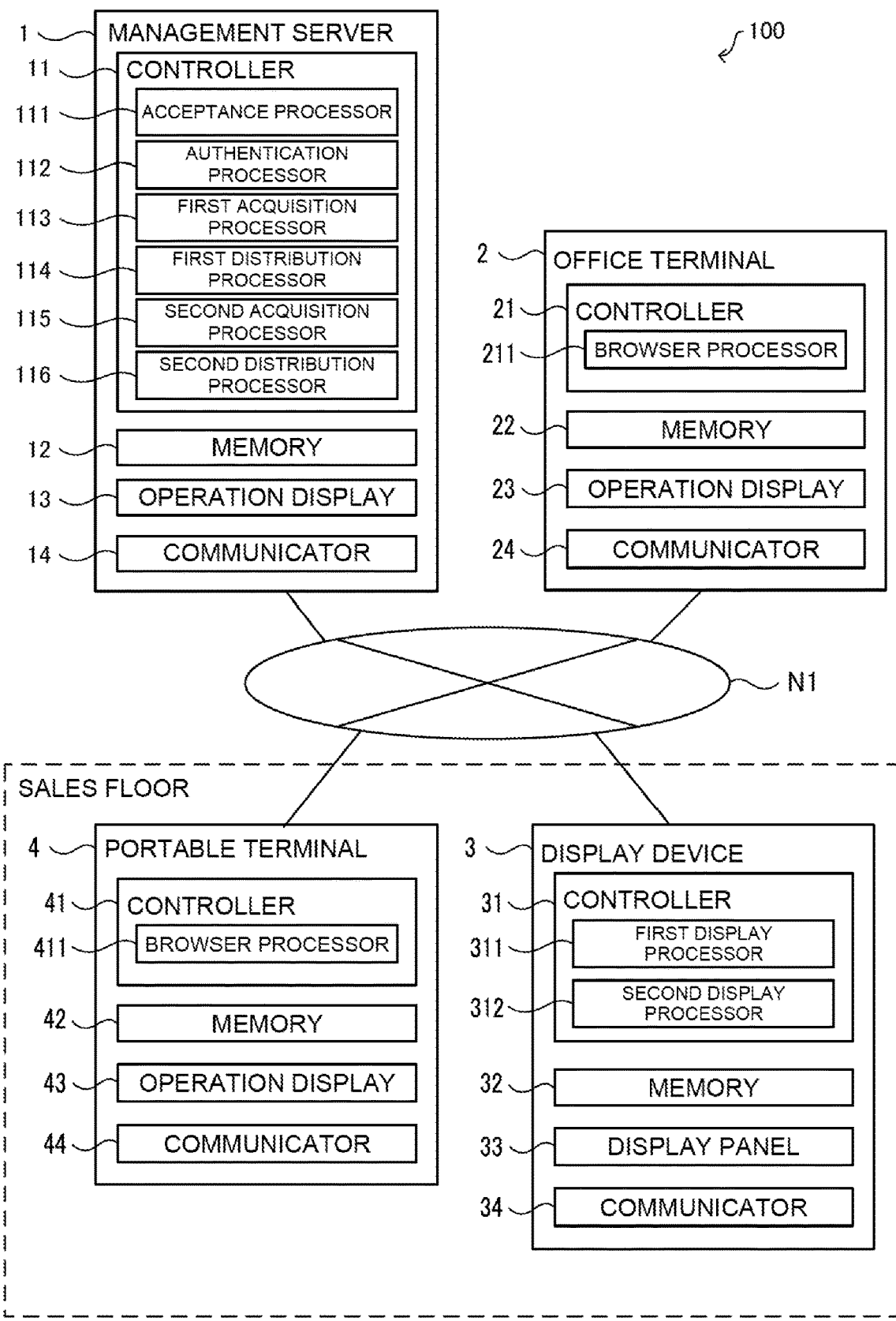
FIG. 2 is a block diagram illustrating a configuration of a content display system according to the embodiment of the present disclosure.

As illustrated in FIG. 2, the management server 1 includes a controller 11, a memory 12, an operation display 13, and a communicator 14. The management server 1 may be, for example, an information processing apparatus such as a personal computer.

The communicator 14 is a communication interface for connecting the management server 1 to the network N1 in a wired or wireless manner and for executing data communication between the office terminal 2, the display device 3, and the portable terminal 4 via the network N1 in accordance with a predetermined communication protocol.

The operation display 13 is a user interface including a display unit and an operation unit. The display unit such as a liquid crystal display or an organic EL display displays various information, whereas the operation unit such as a mouse, keyboard, or touch panel receives operations. The operation display 13 accepts, for example, an operation by an administrator of the management server 1.

Figure 3:
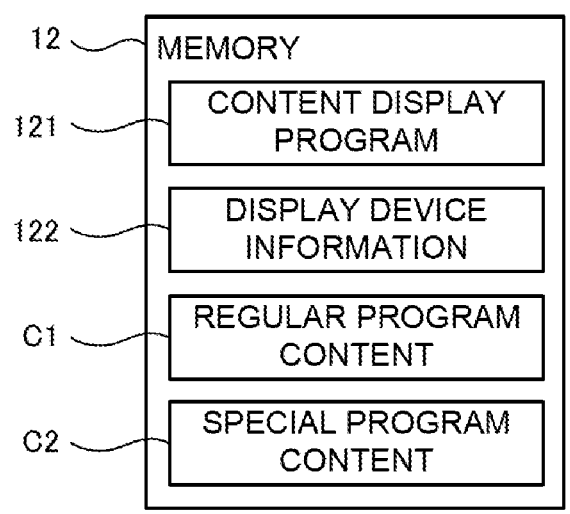
FIG. 3 illustrates an example of data registered in the management server according to the embodiment of the present disclosure.

The memory 12 is a non-volatile storage including a hard disk drive (HDD), a solid state drive (SSD), or a flash memory that stores various types of information. The memory 12 stores a control program such as a content displaying program 121 (see FIG. 3) to cause the controller 11 to execute the content display processing (see FIG. 18) which will be described later. For example, the content displaying program 121 is temporarily recorded in a computer-readable recording medium such as a compact disk (CD) or digital versatile disc (DVD), read by a reader (not shown) such as CD drive or DVD drive of the management server 1, and stored in the memory 12. The content displaying program 121 may be distributed from a cloud server and stored in the memory 12.

The memory 12 stores various information for displaying the content. Specifically, the memory 12 stores data such as display device information 122 about the display device 3 that displays the content, the regular program content C1, the special program content C2, a schedule for displaying the content, a playlist, setting information.

The display device information 122 includes information involving one or more display devices 3 installed in the store. For example, in the display device information 122, information such as a name and an installation location is associated to and registered for each display device 3. The regular program content C1 is, for example, the content that is registered to the office terminal 2. The special program content C2 is, for example, the content that is registered to the portable terminal 4.

Note that as another embodiment, some or all of the display device information 122, a schedule for displaying the regular program content C1 and the special program content C2, a playlist, and setting information may be stored in a data server accessible from the management server 1. In this case, the controller 11 of the management server 1 may acquire the information from the data server and execute individual processing such as the content display processing (see FIG. 18) which will be described later.

The controller 11 includes control devices such as a CPU, a ROM, and a RAM. The CPU is a processor that executes various arithmetic operations. The ROM is a non-volatile memory in which a control program such as BIOS and OS for causing the CPU to execute various processes is stored in advance. The RAM is a volatile or non-volatile memory that stores various types of information and is used as a temporary storage memory (working area) for various processes executed by the CPU. The controller 11 controls the management server 1 by causing the CPU to execute various types of control programs stored in advance in the ROM or the memory 12.

Specifically, the controller 11 includes various processors such as an acceptance processor 111, an authentication processor 112, a first acquisition processor 113, a first distribution processor 114, a second acquisition processor 115, and a second distribution processor 116.

Note that the controller 11 functions as the various types of process operators by executing various types of processes according to the content displaying program 121. A part or all of the processing portions included in the controller 11 may be implemented by an electronic circuit. The content displaying program 121 may be a program for making a plurality of processors function as the various processors described above.

The acceptance processor 111 receives various operations of the user. Specifically, the acceptance processor 111 accepts operations by an administrator via the office terminal 2, such as a login operation to a website of a content display application program, a setting operation and a registration operation related to the regular program content C1, and an instruction to distribute the regular program content C1. The acceptance processor 111 accepts operations by a staff member via the portable terminal 4, such as a login operation to a website of the content display application program, a setting operation and a registration operation involving the special program content C2, and an instruction to distribute the special program content C2. For example, the acceptance processor 111 accepts a selection operation of the special program content C2, an input operation of a ticker message Tx corresponding to the special program content C2, and a selection operation of the display device 3 to which the special program content C2 is to be distributed. For example, the acceptance processor 111 accepts an operation from a staff member to select a video image or still image taken at a predetermined location by the portable terminal 4 as the special program content C2.

Note that the controller 11 causes the various operation screens to be displayed as web pages on the office terminal 2 and the portable terminal 4.

The authentication processor 112 executes an authentication process for the user. For example, when the administrator inputs user information (user ID and password) on a login screen of the content display application program displayed on the office terminal 2, the authentication processor 112 acquires the user ID and the password and executes the authentication process. Similarly, for example, when a staff member inputs user information (user ID and password) on a login screen of the content display application program displayed on the portable terminal 4, the authentication processor 112 acquires the user ID and the password and executes the authentication process. When the user ID and the password of the user are registered in the user information (not illustrated), the authentication processor 112 authenticates the user and allows the user to use the content display application program.

When the authentication processor 112 authenticates the administrator, the administrator can use the office terminal 2 to perform a registration operation related to the content (the regular program content C1) and issue a distribution instruction of the regular program content C1. When the authentication processor 112 authenticates a staff member, the staff member can use the portable terminal 4 to perform a registration operation related to the content (the special program content C2) and issue a distribution instruction of the special program content C2.

The first acquisition processor 113 acquires the regular program content C1 to be registered in the office terminal 2. For example, the administrator registers a video image (video image, still image, etc.) to be displayed on the display device 3 as the regular program content C1 on the registration screen displayed on the office terminal 2. The administrator may select the regular program content C1 from data stored in the office terminal 2 or from data stored in an external server. When multiple display devices 3 are installed in the sales floor, the administrator selects and registers one or more display devices 3 among the multiple display devices 3 on which the regular program content C1 is to be displayed. The administrator also registers a schedule including the date, time, and display time for displaying the regular program content C1.

The first acquisition processor 113 acquires the regular program content C1 registered by the administrator, information (identification information) on the display devices 3 used for display, and the schedule. The first acquisition processor 113 stores the regular program content C1, the identification information of the display devices 3, and the schedule in the memory 12 (see FIG. 3). The first acquisition processor 113 is an example of a first acquisition processor of the disclosure.

The first distribution processor 114 distributes the regular program content C1 acquired by the first acquisition processor 113 to the display devices 3. Specifically, when the acceptance processor 111 accepts an instruction to distribute the regular program content C1 from the administrator via the office terminal 2, the first distribution processor 114 distributes the regular program content C1 and the schedule to the display devices 3 registered as display destinations (distribution destination).

Figure 4:
FIG. 4 illustrates an example of the display of the display device according to the embodiment of the present disclosure.

The display devices 3 displays the regular program content C1 on the basis of the schedule. FIG. 4 illustrates the regular program content C1 being displayed on one of the display devices 3 installed in a sales floor SH.

Here, in some cases, such as when a time sale is to be held, a staff member of the sales floor SH may want to display on the display device 3 the special program content C2 introducing products that are subject to a time sale, in place of the regular program content C1 (see FIG. 4). In order to display the special program content C2 in such a case, it takes time and effort for the staff member to return to the office terminal 2 to perform an operation to display the special program content C2 as a replacement, or to contact the administrator to request replacement with the special program content C2. In contrast, the content display system 100 of the present embodiment has a configuration that enables the regular program content C1 displayed on the display device 3 to be easily and quickly switched to the special program content C2, as described below.

Specifically, the second acquisition processor 115 acquires the special program content C2 on the basis of an operation on the portable terminal 4 by a staff member when the regular program content C1 is displayed on the display device 3.

Figure 5:
FIG. 5 is a diagram illustrating an example of the display screen of the portable terminal according to the embodiment of the present disclosure.

For example, a staff member of the sales floor SH selects and registers the display destination display device 3 to which the special program content C2 is to be displayed on the display panel registration screen illustrated in FIG. 5 displayed on the portable terminal 4. Note that when multiple display devices 3 are installed in each of the sales floor group, the staff member can also select a group and register all display devices 3 belonging to the selected group.

Figure 6:
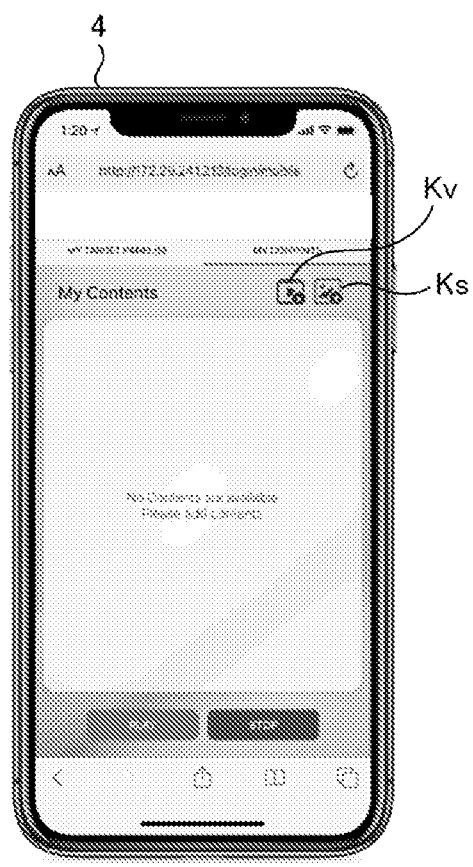
FIG. 6 is a diagram illustrating an example of the display screen of the portable terminal according to the embodiment of the present disclosure.
Figure 7:
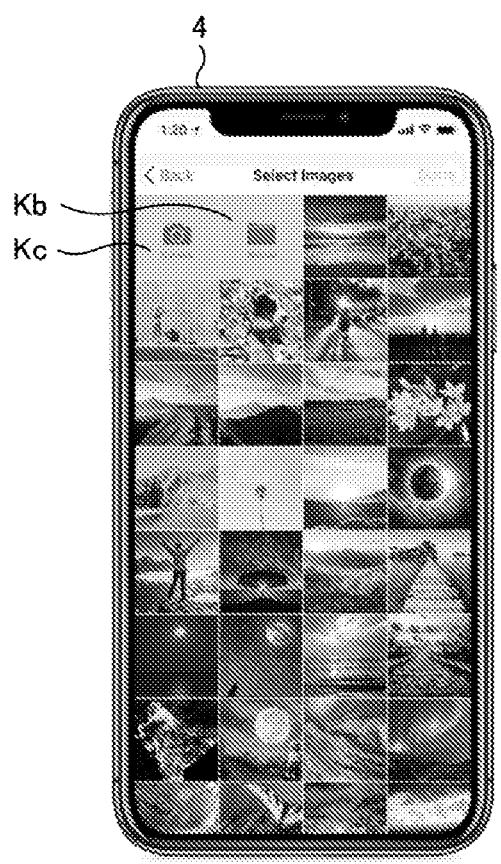
FIG. 7 is a diagram illustrating an example of the display screen of the portable terminal according to the embodiment of the present disclosure.

The staff member then registers the special program content C2 on the content registration screen displayed on the portable terminal 4, as illustrated in FIG. 6. The content registration screen illustrated in FIG. 6 includes a still image button Ks that displays a list of still images and a video image button Kv that displays a list of video images. When a staff member presses the still image button Ks, the list of still images illustrated in FIG. 7 is displayed on the portable terminal 4. The data of the still image is, for example, the image data stored in the memory 42 of the portable terminal 4. The staff member may select the special program content C2 from the list, or may register a photo or video taken with the portable terminal 4 by pressing a camera button Kc as the special program content C2, or may register an image searched on the Internet by pressing a browser button Kb as the special program content C2.

Figure 8:
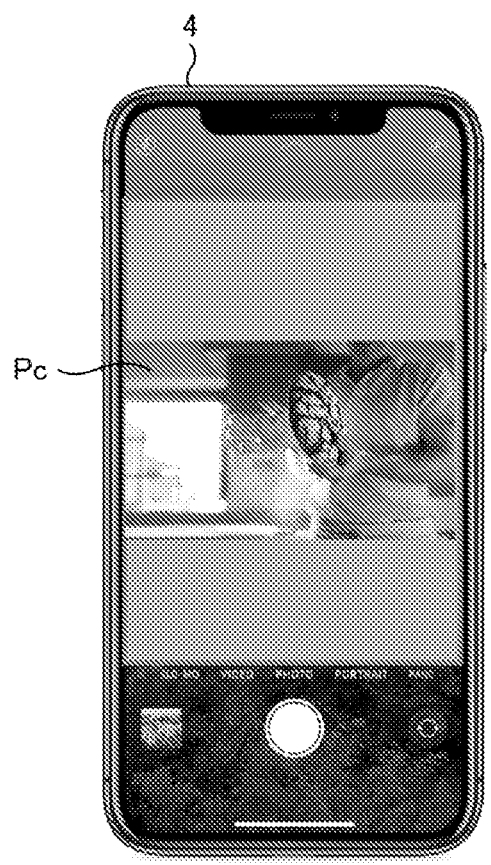
FIG. 8 is a diagram illustrating an example of the display screen of the portable terminal according to the embodiment of the present disclosure.

FIG. 8 illustrates a photo Pc taken by a staff member with the portable terminal 4 by pressing the camera button Kc. For example, in order to advertise freshly baked bread as a time sale item, a staff member takes a picture of bread being made in a kitchen with the portable terminal 4.

Figure 9:
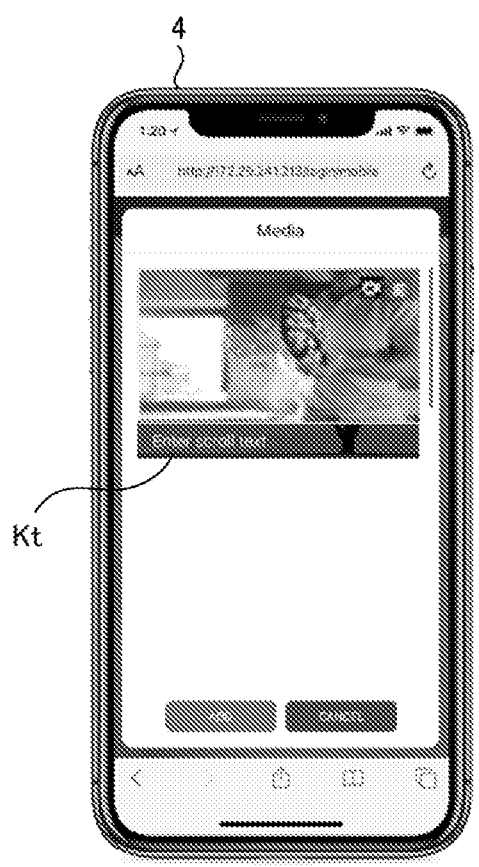
FIG. 9 is a diagram illustrating an example of the display screen of the portable terminal according to the embodiment of the present disclosure.
Figure 10:
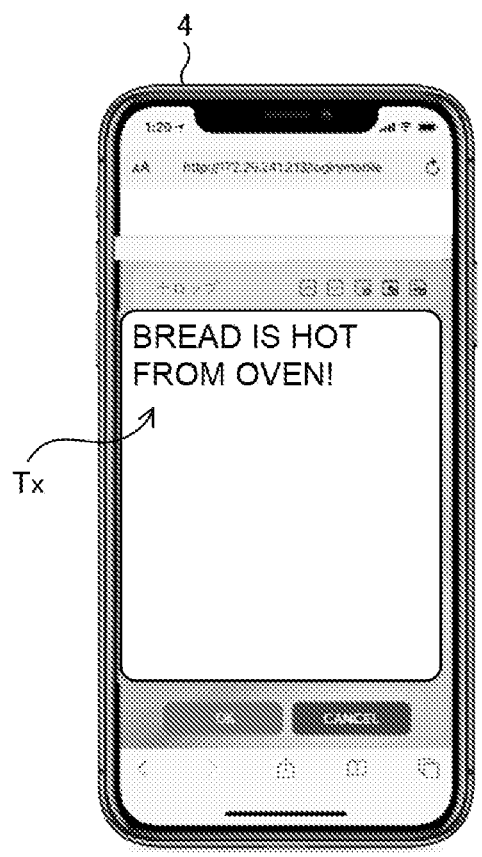
FIG. 10 is a diagram illustrating an example of the display screen of the portable terminal according to the embodiment of the present disclosure.

When the staff member selects and registers the photo Pc, the second acquisition processor 115 acquires the photo Pc as the special program content C2. The registered special program content C2 is displayed on the portable terminal 4 (see FIG. 9). The content registration screen illustrated in FIG. 9 displays a ticker message registration button Kt for registering a ticker message Tx (an example of text information of the disclosure). When the staff member presses the ticker message registration button Kt, the ticker message registration screen illustrated in FIG. 10 is displayed on the portable terminal 4. The staff member registers the ticker message Tx by entering a desired message on the ticker message registration screen.

Figure 11:
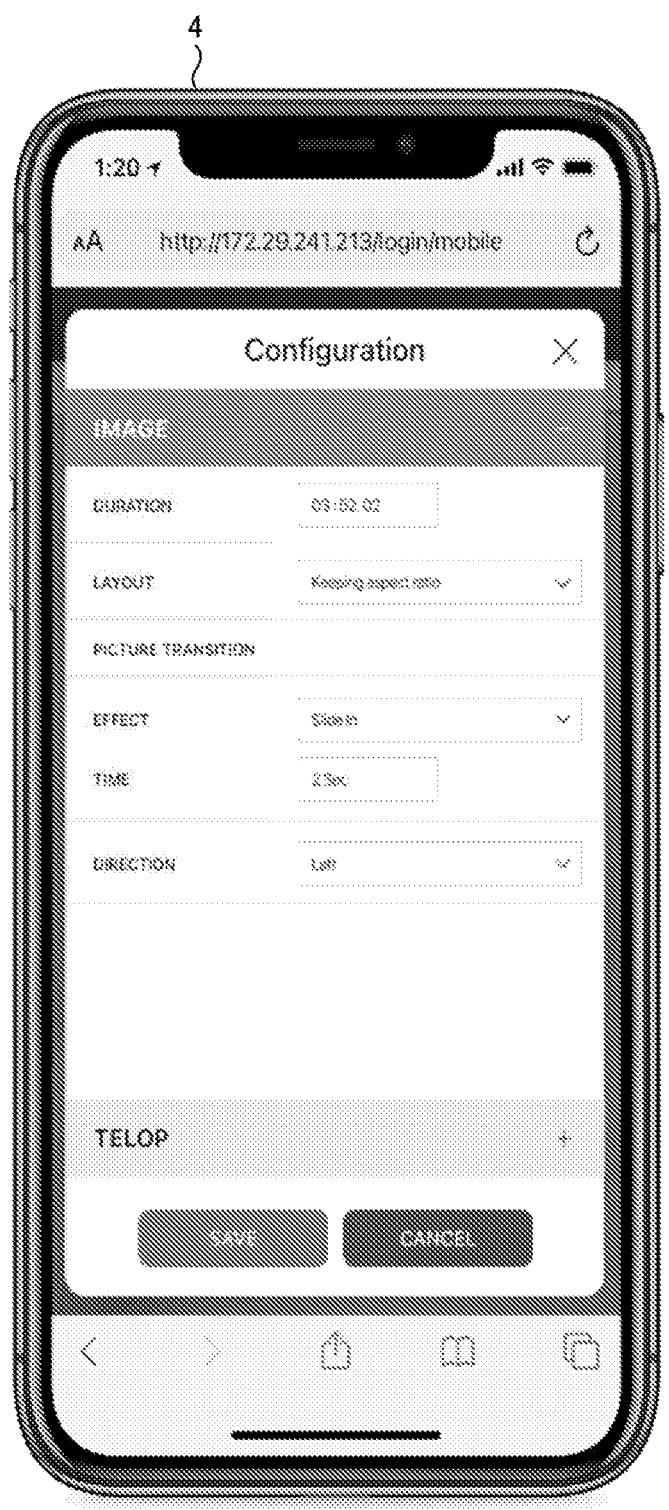
FIG. 11 is a diagram illustrating an example of the display screen of the portable terminal according to the embodiment of the present disclosure.
Figure 12:
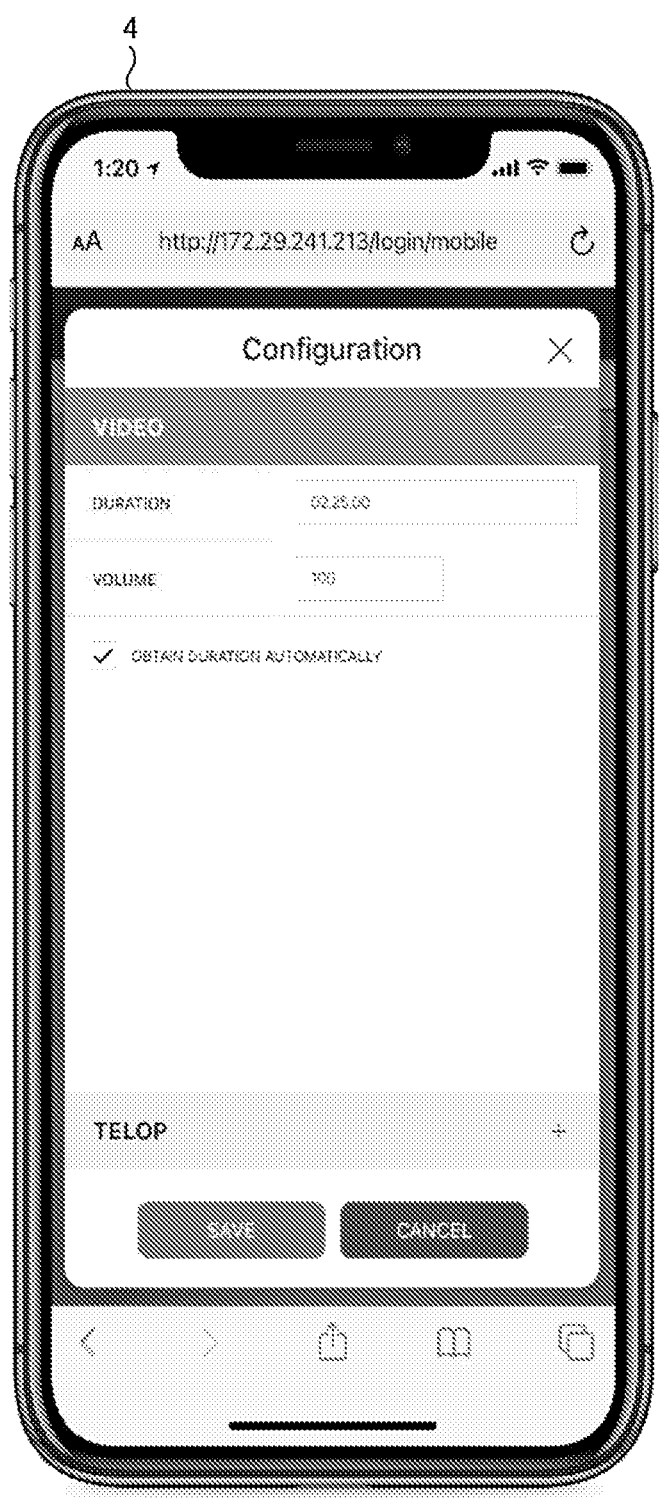
FIG. 12 is a diagram illustrating an example of the display screen of the portable terminal according to the embodiment of the present disclosure.
Figure 13:
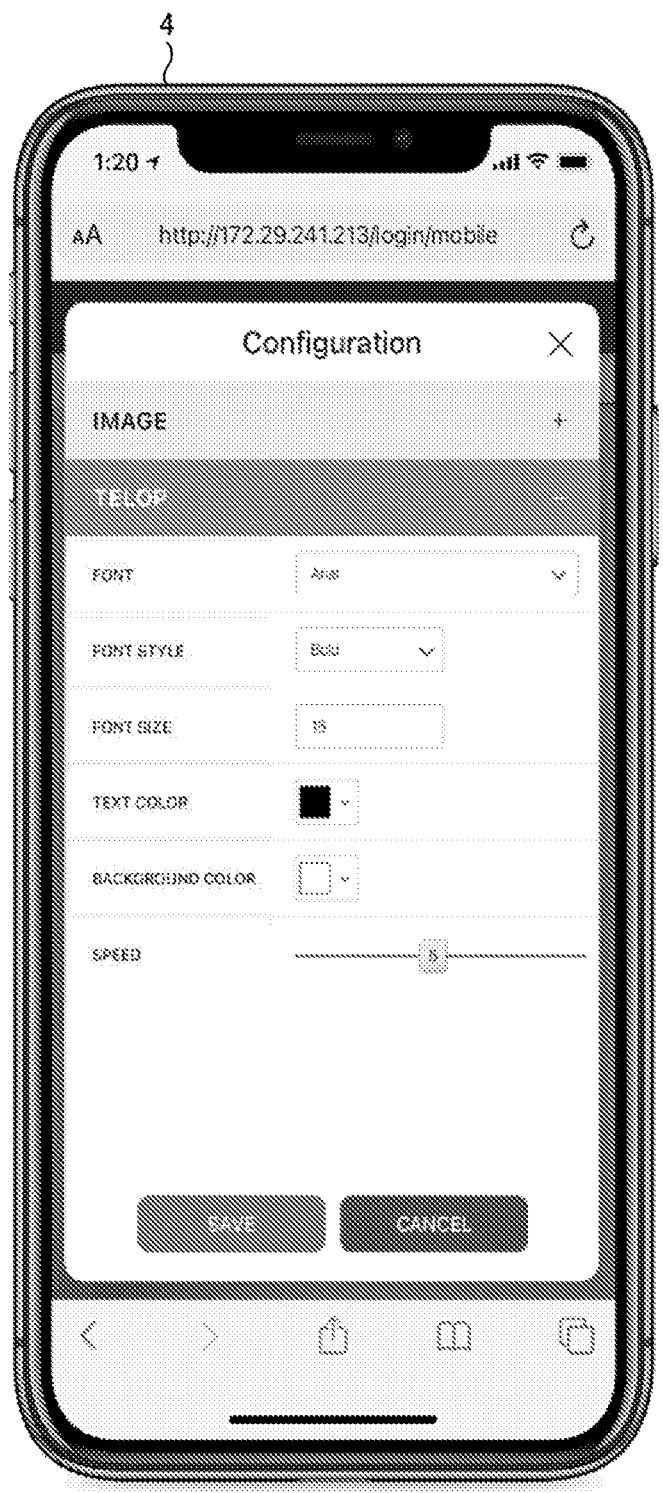
FIG. 13 is a diagram illustrating an example of the display screen of the portable terminal according to the embodiment of the present disclosure.

The staff member then sets the display time, layout, screen transition, etc., of the special program content C2 on a still image setting screen illustrated in FIG. 11. Alternatively, the staff member sets the display time, sound volume, etc., of the special program content C2 on a moving image setting screen illustrated in FIG. 12. The staff member also sets the font, size, color, etc., of the ticker message Tx corresponding to the special program content C2 on a ticker message setting screen illustrated in FIG. 13. The second acquisition processor 115 acquires the information of the ticker message Tx.

Figure 14:
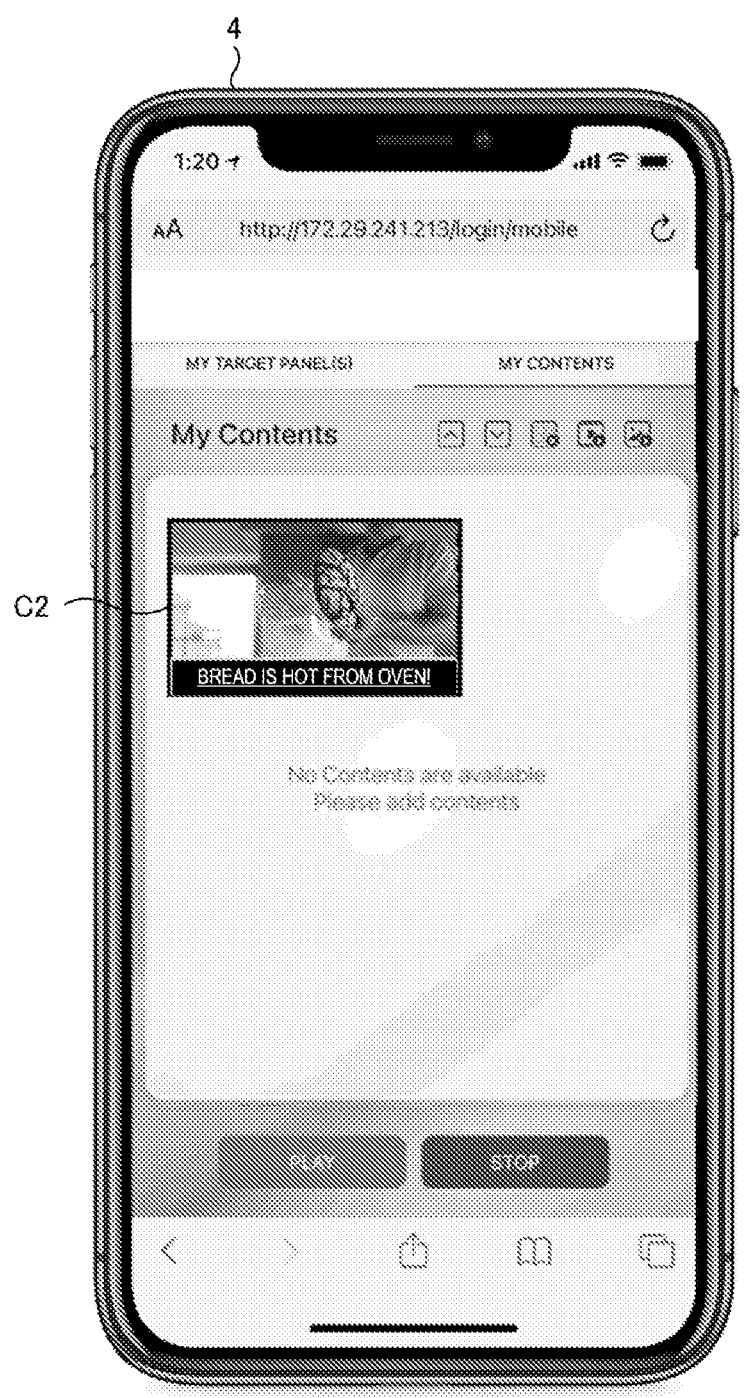
FIG. 14 is a diagram illustrating an example of the display screen of the portable terminal according to the embodiment of the present disclosure.

When each of the registration operations by the staff member is completed, the content confirmation screen illustrated in FIG. 14 is displayed on the portable terminal 4. As illustrated in FIG. 14, the content confirmation screen displays the display status of the special program content C2 and the ticker message Tx. After confirming the content confirmation screen, the staff member sets the distribution method of the special program content C2 on the distribution method setting screen illustrated in FIG. 15. For example, the staff member selects whether the special program content C2 is to be distributed immediately or at a set time. The staff member also sets the distribution period of the special program content C2. When the setting of the distribution method is completed, the registration of the special program content C2 is completed (see FIG. 16). The second acquisition processor 115 acquires the information of the distribution method. The second acquisition processor 115 is an example of a second acquisition processor of the disclosure.

Figure 17:
FIG. 17 illustrates an example of the display of the display device according to the embodiment of the present disclosure.

The second distribution processor 116 distributes the special program content C2 acquired by the second acquisition processor 115 to the display device 3 displaying the regular program content C1. Specifically, the second distribution processor 116 distributes the special program content C2 and the ticker message Tx selected and registered by the staff member to the display device 3 selected by the staff member in accordance with the distribution method described above. The display device 3 on the sales floor SH switches the content to be displayed from the regular program content C1 (see FIG. 4) to the special program content C2, for example, as illustrated in FIG. 17.

Note that when the display processing of the special program content C2 (see FIG. 17) is completed, the display device 3 executes again the display processing of the regular program content C1 (see FIG. 4). That is, the display device 3 switches the display content from the special program content C2 to the regular program content C1.

As described above, the management server 1 distributes the regular program content C1 acquired via the office terminal 2 to a predetermined display device 3, and distributes the special program content C2 acquired via the portable terminal 4 to the predetermined display device 3. When the predetermined display device 3 receives the regular program content C1, the regular program content C1 is displayed, and when the predetermined display device 3 acquires the special program content C2, the special program content C2 is displayed in replacement of the regular program content C1.

Office Terminal 2

As illustrated in FIG. 2, the office terminal 2 includes a controller 21, a memory 22, an operation display 23, and a communicator 24. The office terminal 2 is, for example, an information processing apparatus such as a personal computer.

The communicator 24 is a communication interface for connecting the office terminal 2 to the network N1 in a wired or wireless manner and for executing data communication between external devices, such as the management server 1, via the network N1 in accordance with a predetermined communication protocol.

The operation display 23 is a user interface including a display such as a liquid crystal display or an organic EL display for displaying information such as various web pages, and an operation unit such as a mouse, a keyboard, or a touch panel that receives operations.

The memory 22 is a non-volatile storage unit such as HDD, SSD or flash storage that stores various types of information. For example, the memory 22 stores a control program such as a browser program. Specifically, the browser program is a control program for causing the controller 21 to perform communication processing with an external device such as the management server 1 according to a communication protocol such as Hypertext Transfer Protocol (HTTP). The browser program can be a dedicated application program for executing the communication processing with the management server 1 in accordance with a predetermined communication protocol. The memory 22 may store data (video, still images, etc.) corresponding to the regular program content C1.

The controller 21 includes control devices such as a CPU, a ROM, and a RAM. The CPU is a processor that executes various arithmetic operations. The ROM is a non-volatile memory in which a control program such as BIOS and OS for causing the CPU to execute various processes is stored in advance. The RAM is a volatile or non-volatile memory that stores various types of information and is used as a temporary storage memory (working area) for various processes executed by the CPU. The controller 21 then controls the office terminal 2 by causing the CPU to execute various types of control programs stored in advance in the ROM or the memory 22.

Specifically, the controller 21 functions as a browser processor 211 by executing various types of processes according to the browser program stored in the memory 22. The browser processor 211 can display on the operation display 23 a web page provided from the management server 1 via the network N1, and execute browser processing to enter operations performed on the operation display 23 to the management server 1. That is, the office terminal 2 is capable of functioning as an operation terminal of the management server 1 as a result of the browser program being executed by the controller 21. Note that some or all of the processing operators included in the controller 21 may be configured by an electronic circuit.

For example, in the office terminal 2, when the user operation is performed to request access to a predetermined URL corresponding to the website of a content distribution service provided by the management server 1, the controller 21 acquires data of the web page of the website from the management server 1 and displays the web page on the operation display 23. In the case where a dedicated application program corresponding to the management server 1 is installed in the office terminal 2, the web page is displayed on the operation display 23 by the administrator of the office terminal 2 performing an operation to start the dedicated application program.

For example, the administrator of the sales floor SH of the store performs a login operation on the login page of the website of the content distribution service displayed on the office terminal 2. The administrator performs registration operation related to the regular program content C1 and issues a distribution instruction for the regular program content C1 on the content registration page displayed on the office terminal 2.

When the regular program content C1 is successfully distributed to the display device 3, the controller 21 acquires the distribution result from the management server 1 and displays it on the operation display 23.

Portable Terminal 4

As illustrated in FIG. 2, the portable terminal 4 includes a controller 41, a memory 42, an operation display 43, and a communicator 44. The portable terminal 4 is, for example, an information processing apparatus such as a smartphone, a mobile phone, or a tablet device.

The communicator 44 is a communication interface for connecting the portable terminal 4 to the network N1 in a wired or wireless manner and for executing data communication between external devices, such as the management server 1, via the network N1 in accordance with a predetermined communication protocol.

The operation display 43 is a user interface including a display such as a liquid crystal display or an organic EL display for displaying information such as various web pages, and an operation unit such as a mouse, a keyboard, or a touch panel that receives operations.

The memory 42 is a non-volatile storage unit such as HDD, SSD or flash storage that stores various types of information. For example, the memory 42 stores a control program such as a browser program. Specifically, the browser program is a control program for causing the controller 41 to perform communication processing with an external device such as the management server 1 according to a communication protocol such as Hypertext Transfer Protocol (HTTP). The browser program can be a dedicated application program for executing the communication processing with the management server 1 in accordance with a predetermined communication protocol. The memory 42 may store data (video, still images, etc.) corresponding to the special program content C2.

The controller 41 includes control devices such as a CPU, a ROM, and a RAM. The CPU is a processor that executes various arithmetic operations. The ROM is a non-volatile memory in which a control program such as BIOS and OS for causing the CPU to execute various processes is stored in advance. The RAM is a volatile or non-volatile memory that stores various types of information and is used as a temporary storage memory (working area) for various processes executed by the CPU. The controller 41 then controls the portable terminal 4 by causing the CPU to execute various types of control programs stored in advance in the ROM or the memory 42.

Specifically, the controller 41 functions as a browser processor 411 by executing various types of processes according to the browser program stored in the memory 42. The browser processor 411 can display on the operation display 43 a web page provided from the management server 1 via the network N1, and execute browser processing to enter operations performed on the operation display 43 to the management server 1. That is, the portable terminal 4 is capable of functioning as an operation terminal of the management server 1 as a result of the browser program being executed by the controller 41. Note that some or all of the processing operators included in the controller 41 may be configured by an electronic circuit.

For example, in the portable terminal 4, when the user operation is performed to request access to a predetermined URL corresponding to the website of a content distribution service provided by the management server 1, the controller 41 acquires data of the web page of the website from the management server 1 and displays the web page on the operation display 43. In the case where a dedicated application program corresponding to the management server 1 is installed in the portable terminal 4, the web page is displayed on the operation display 43 by a staff member carrying the portable terminal 4 performing an operation to start the dedicated application program.

For example, the staff member of the sales floor SH of the store performs a login operation on the login page of the website of the content distribution service displayed on the portable terminal 4. The staff members also perform a registration operation related to the special program content C2 and ticker message Tx (see FIGS. 5 to 17) and issues a distribution instruction for the special program content C2 on the content registration page displayed on the portable terminal 4.

When the special program content C2 is successfully distributed to the display device 3, the controller 41 acquires the distribution result from the management server 1 and displays it on the operation display 43.

Display Device 3

As illustrated in FIG. 2, the display device 3 includes a controller 31, a memory 32, a display panel 33, and a communicator 34.

The communicator 34 is a communication interface for connecting the display device 3 to the network N1 in a wired or wireless manner and for executing data communication with the management server 1 via the network N1 in accordance with a predetermined communication protocol.

The display panel 33 is a liquid crystal display or an organic EL display that displays various types of information.

The memory 32 is a non-volatile storage unit such as HDD, SSD or flash storage that stores various types of information. The memory 32 stores a control program for causing the controller 31 to execute various types of control processing. For example, the control program is recorded non-temporarily in a computer-readable recording medium such as a CD or a DVD, is read by a reading device (not illustrated) such as a CD drive or a DVD drive provided in the display device 3, and is stored in the memory 32.

The memory 32 stores various information for reproducing the content. Specifically, the memory 32 stores content data such as the regular program content C1 and the special program content C2 a schedule for displaying (playing) the content, and a playlist of the content.

The controller 31 includes control devices such as a CPU, a ROM, and a RAM. The CPU is a processor that executes various arithmetic operations. The ROM is a non-volatile memory in which a control program such as BIOS and OS for causing the CPU to execute various processes is stored in advance. The RAM is a volatile or non-volatile memory that stores various types of information and is used as a temporary storage memory (working area) for various processes executed by the CPU. The controller 31 controls the display device 3 by causing the CPU to execute various types of control programs stored in advance in the ROM or the memory 32.

Specifically, the controller 31 includes various processors such as a first display processor 311 and a second display processor 312. The controller 31 receives the regular program content C1, the special program content C2, the schedules for displaying each piece of content, a playlist, setting information, and the like, which are delivered from the management server 1.

The first display processor 311 receives the regular program content C1 distributed from the management server 1 and causes the display panel 33 to display the regular program content C1 in accordance with the schedule (see FIG. 4). The first display processor 311 is an example of a first display processor according to the present disclosure.

When the second display processor 312 receives the special program content C2 distributed from the management server 1 while the regular program content C1 is being displayed, the special program content C2 is displayed on the display panel 33 in replacement of the regular program content C1 (see FIG. 17). When the second display processor 312 receives the ticker message Tx from the management server 1, the second display processor 312 causes the ticker message Tx to be displayed on the display panel 33 (see FIG. 17). The second display processor 312 is an example of a second display processor according to the present disclosure.

Note that the first display processor 311 and the second display processor 312 may be included in the management server 1. In this such a case, the management server 1 sends a display command together with each piece of content to the display device 3 to display each piece of content on the display device 3. For example, the first display processor 311 of the management server 1 causes the display device 3 to display the regular program content C1 registered by the administrator in accordance with the schedule described above, and the second display processor 312 of the management server 1 causes the display device 3 to display the special program content C2 registered by a staff member with the portable terminal 4 in replacement of the regular program content C1. The content display system of the disclosure may be a device in which the management server 1 and the display device 3 are integrated.

Content Display Processing

Figure 18:
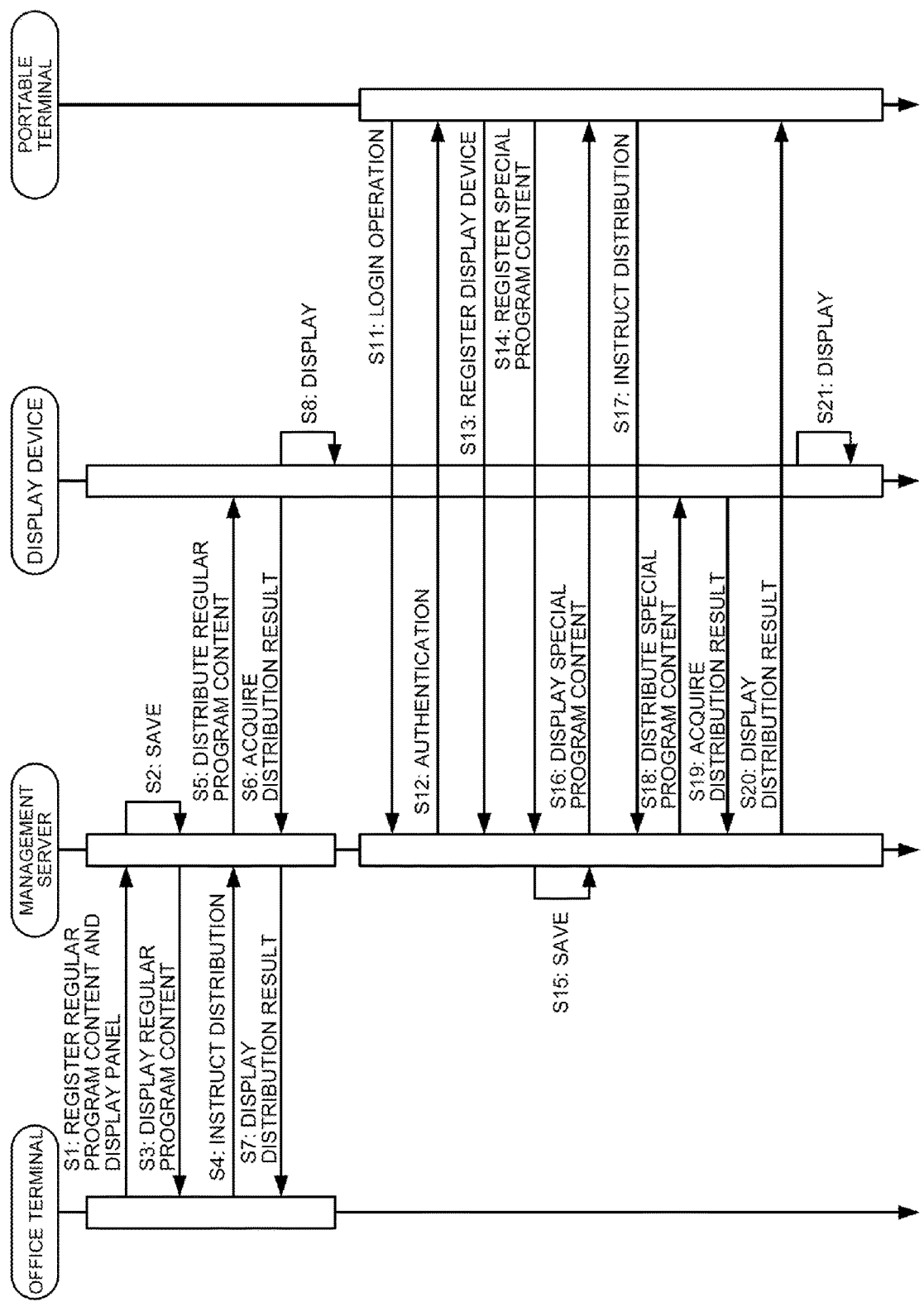
FIG. 18 is a flowchart for explaining an example of a procedure for content display processing performed in the content display system according to the embodiment of the present disclosure.

An example of the procedure of content display processing executed by the content display system 100 will now be explained with reference to FIG. 18.

Note that the disclosure can be construed as a disclosure of a content display method for executing one or more steps included in the content display processing. In the content display processing described here, one or more steps may be omitted as appropriate. The execution order of steps in the content display processing may differ to the extent that similar effects are produced. Although a case in which the controller 11 of the management server 1, the controller 21 of the office terminal 2, the controller 31 of the display device 3, and the controller 41 of the portable terminal 4 execute the steps in the content display processing are explained as an example, in other embodiments, multiple processors may execute the steps of the content display processing.

First, in step S1, the controller 21 of the office terminal 2 accepts an operation to select and register the regular program content C1 and the display device 3 that displays the regular program content C1 from the administrator who has logged in to the website of the content display application program with the office terminal 2.

In step S2, the controller 11 of the management server 1 acquires the data of the regular program content C1 registered by the administrator and the identification information of the distribution destination display device 3 to which the regular program content C1 is to be distributed, and stores them in the memory 12. Step S2 is an example of a first acquisition step according to the disclosure.

In step S3, the controller 11 of the management server 1 causes the office terminal 2 to display the regular program content C1 and accepts a distribution instruction from the administrator. In step S4, the controller 21 of the office terminal 2 sends the distribution instruction of the administrator to the management server 1.

In step S5, when the controller 11 of the management server 1 accepts the distribution instruction, it delivers the data of the regular program content C1 to the display device 3. When the controller 31 of the display device 3 receives the data of the regular program content C1, the controller 31 sends the distribution result to the management server 1.

When the controller 11 of the management server 1 acquires the distribution result (step S6), the controller 11 sends the distribution result to the office terminal 2 for display (step S7).

In step S8, the controller 31 of the display device 3 causes the display panel 33 to display the regular program content C1 received from the management server 1. This causes a predetermined display device 3 on the sales floor SH (see FIG. 4) to display the regular program content C1 registered by the administrator. Step S8 is an example of a first display process according to the disclosure.

When the regular program content C1 is displayed on the display device 3, a staff member of the sales floor SH logs in to the website on the portable terminal 4 (step S11). When the controller 11 of the management server 1 authenticates the staff member (step S12), the controller 11 permits acceptance of the registration operation of the special program content C2.

The staff member performs an operation (see FIG. 5) to register the display device 3 for displaying the special program content C2 on the portable terminal 4 (step S13). The staff member also performs an operation (see FIGS. 6 to 13) to select and register the special program content C2, the ticker message Tx, the setting information, etc., on the portable terminal 4 (step S14).

In step S15, the controller 11 of the management server 1 acquires the of the special program content C2 and the ticker message Tx registered by the staff member, the setting information, and the identification information of the distribution destination display device 3 to which the special program content C2 is to be distributed, and stores them in the memory 12. Step S15 is an example of a second acquisition step according to the disclosure.

Figure 15:
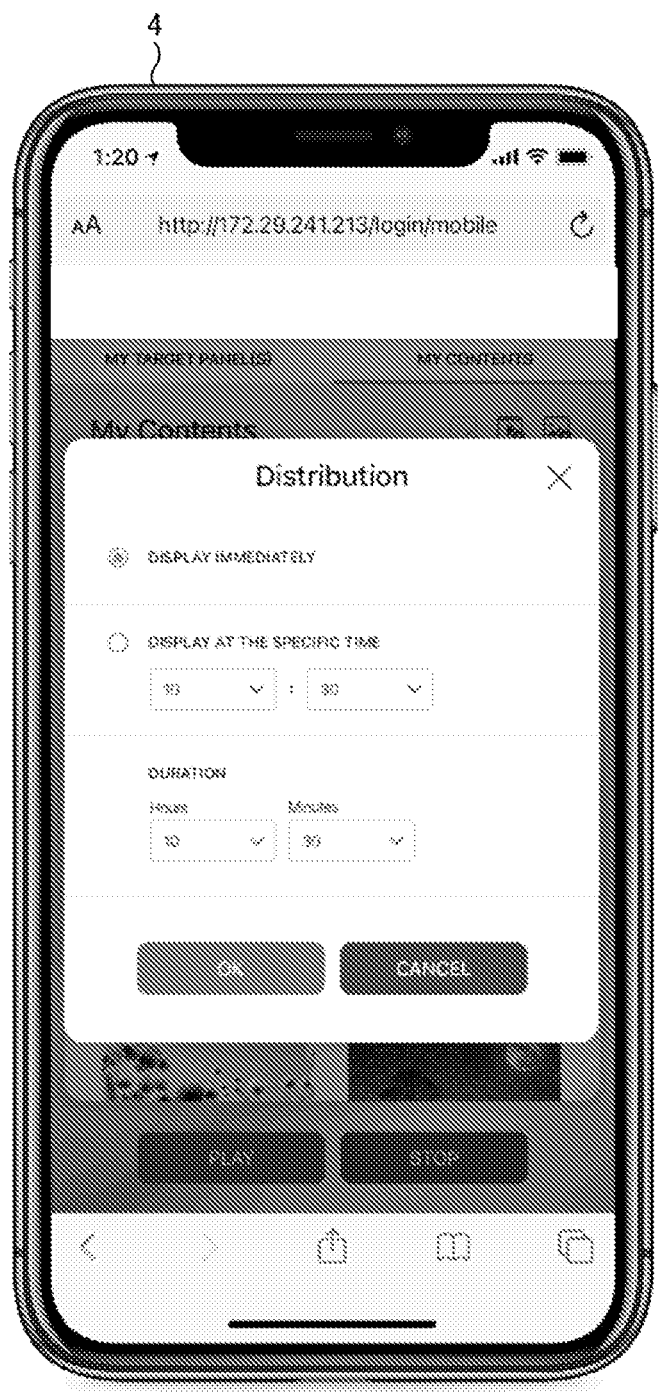
FIG. 15 is a diagram illustrating an example of the display screen of the portable terminal according to the embodiment of the present disclosure.
Figure 16:
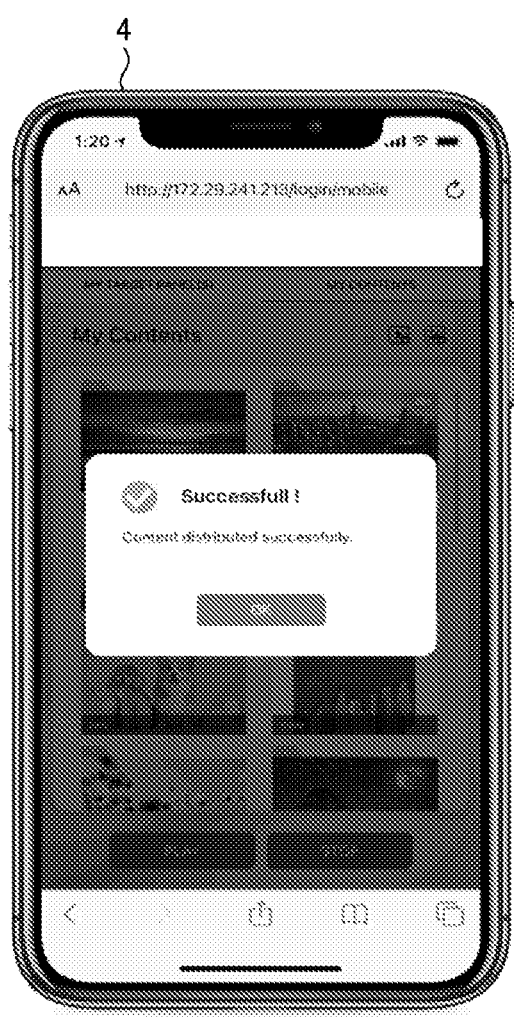
FIG. 16 is a diagram illustrating an example of the display screen of the portable terminal according to the embodiment of the present disclosure.

In step S16, the controller 11 of the management server 1 causes the portable terminal 4 to display the special program content C2 and accepts a distribution instruction from a staff member (see FIGS. 14 and 15). In step S17, the controller 41 of the portable terminal 4 sends the distribution instruction of the staff member to the management server 1.

In step S18, when the controller 11 of the management server 1 accepts the distribution instruction, it delivers the data of the special program content C2 to the display device 3. When the controller 31 of the display device 3 receives the data of the special program content C2, the controller 31 sends the distribution result to the management server 1.

When the controller 11 of the management server 1 acquires the distribution result from the display device 3 (step S19), the controller 11 sends the distribution result to the portable terminal 4 for display (see FIG. 16) (step S20). The staff member confirms the distribution result on the portable terminal 4 (see FIG. 16).

In step S21, the controller 31 of the display device 3 causes the display panel 33 to display the special program content C2 received from the management server 1. This causes the display device 3 on the sales floor SH (see FIG. 17) to display the special program content C2 registered by the staff member in a replacement of the regular program content C1 (see FIG. 4). Step S21 is an example of a second display step according to the disclosure. As described above, the content display system 100 executes the content display processing to replace the regular program content C1 displayed on the display device 3 with the special program content C2.

As described above, the content display system 100 of the present embodiment acquires the regular program content C1 registered in the office terminal 2 and causes the display device 3 to display the regular program content C1, and when the regular program content C1 is displayed on the display device 3 acquires the special program content C2 on the basis of a user operation on the portable terminal 4. The content display system 100 causes the display device 3 to display the acquired special program content C2. This allows a staff member to replace the regular program content C1 with the special program content C2 by operating the portable terminal 4 carry by himself or herself, not by operating the office terminal 2. Therefore, it is possible to readily and quickly switch the regular program content C1 displayed on the display device 3 to the special program content C2.

Figure 19:
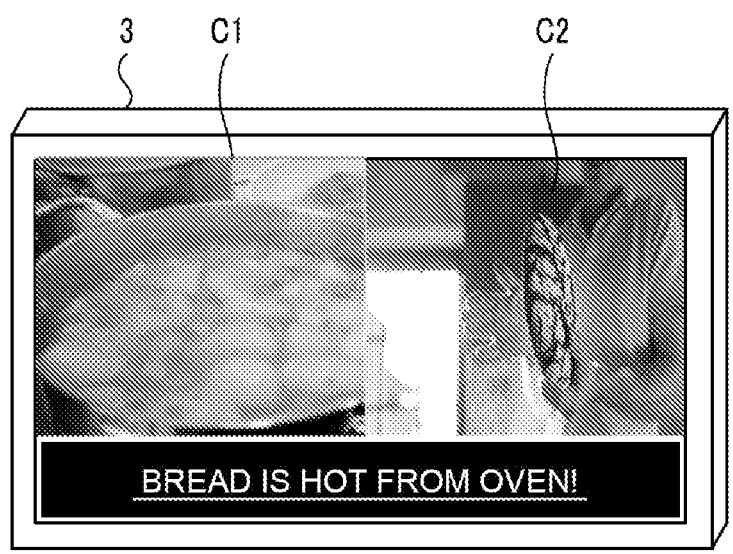
FIG. 19 illustrates an example of the display of the display device according to the embodiment of the present disclosure.

The disclosure is not limited to the embodiments described above. In the above-described embodiment, the second display processor 312 switches the content to be displayed on the display device 3 from the regular program content C1 to the special program content C2, but the disclosure is not limited thereto. In another embodiment, when the regular program content C1 is displayed on the display device 3 and the second acquisition processor 115 acquires the special program content C2 via the portable terminal 4, the second display processor 312 may display the regular program content C1 and the special program content C2 on the display device 3 side by side as illustrated in FIG. 19. Alternatively, the second display processor 312 may superimpose the special program content C2 on the regular program content C1 for display on the display device 3.

Figure 20:
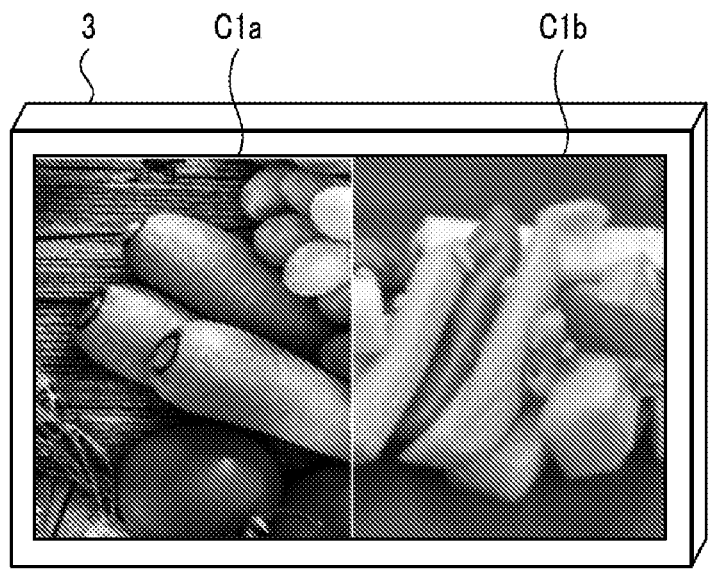
FIG. 20 illustrates an example of the display of the display device according to the embodiment of the present disclosure.
Figure 21:
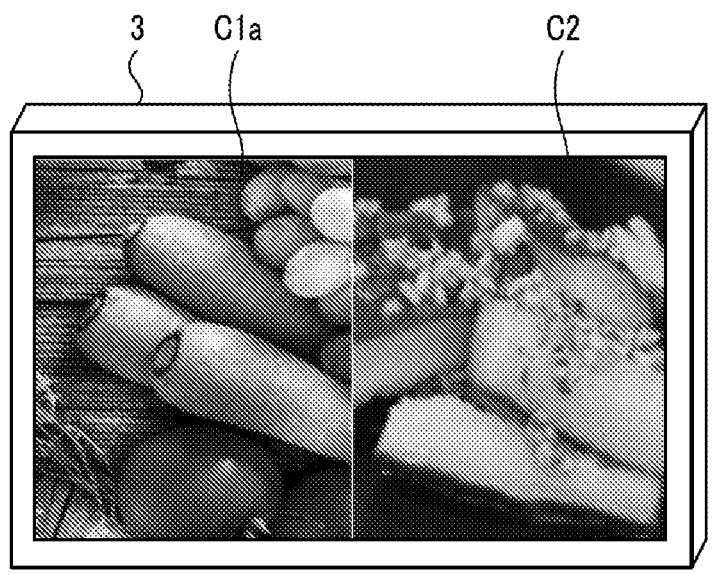
FIG. 21 illustrates an example of the display of the display device according to the embodiment of the present disclosure.

In another embodiment, the first display processor 311 may cause the display device 3 to display multiple pieces of regular program content C1 For example, as illustrated in FIG. 20, the first display processor 311 displays two pieces of regular program content C1a and C1b registered by the administrator side by side on the display device 3. In such a case, the second display processor 312 may switch one of the multiple pieces of regular program content C1 displayed on the display device 3 to the special program content C2. For example, a staff member selects, on the portable terminal 4, the regular program content C1b to be hidden among the two pieces of regular program content C1a and C1b displayed on display device 3 and registers the special program content C2. As illustrated in FIG. 21, the second display processor 312 replaces the regular program content C1b with the special program content C2 and causes the display device 3 to display the regular program content C1a and the special program content C2.

In another embodiment, the authentication processor 112 may determine whether or not a user (staff member) is authorized to display the special program content C2 on the display device 3. For example, the authority is granted to a particular staff member of the sales floor SH who is an executive officer. The information of the authority is registered in the memory 12 of the management server 1. When the staff member is authenticated by the authentication processor 112, the second display processor 312 causes the display device 3 to display the special program content C2 registered by the staff member. When the staff member is not authenticated by the authentication processor 112, the second display processor 312 causes the display device 3 not to display the special program content C2 registered by the staff member. This can prevent the content being displayed on the display device 3 from being improperly replaced.

In another embodiment, when a staff member registers the special program content C2 to the portable terminal 4, the authentication processor 112 may request approval by the administrator of the office terminal 2. In such a case, the second display processor 312 displays the special program content C2 on the display device 3 when the approval of the administrator is obtained at the office terminal 2. This can prevent the content being displayed on the display device 3 from being improperly replaced.

In the above-described embodiment, the content display system 100 corresponds to the content display system according to the disclosure, but the content display system according to the disclosure is not limited thereto. For example, the content display system according to the disclosure may include the management server 1 alone or may include the management server 1, the office terminal 2, and the portable terminal 4.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A content display system that causes a display device installed at a predetermined location to display predetermined content, the system comprising:
   a display processor that causes the display device to display first content;
   an acquisition processor that acquires second content based on an operation on a portable terminal by a user when the first content is displayed on the display device; and
   an acceptance processor that accepts a setting operation corresponding to the second content from the user via the portable terminal,
   wherein the display processor causes the display device to display the second content acquired by the acquisition processor while the first content is being displayed on the display device, and
   the acceptance processor accepts from the user an operation to select the second content, an operation to select the display device for displaying the second content, and an operation to set a schedule for displaying the second content.

2. The content display system according to claim 1, wherein the portable terminal and the display device are connected with each other via the Internet.

3. The content display system according to claim 1, wherein the second content is a video image or a still image taken with the portable terminal, and the second content is transferred to and displayed on the display device.

4. The content display system according to claim 1, wherein the second content is text information that has been registered by the user to the portable terminal, and the second content is transferred to and displayed on the display device.

5. The content display system according to claim 1, wherein the acceptance processor accepts from the user an operation to select either switching the content displayed on the display device from the first content to the second content, or causing the first content and the second content to be displayed side-by-side on the display device.

6. The content display system according to claim 1, wherein the display processor causes the display device to display a plurality of first contents, and switches one of the plurality of first contents displayed on the display device, to the second content.

7. The content display system according to claim 1, wherein the first content is distributed from a terminal that is different from the portable terminal.

8. The content display system according to claim 1, wherein the second content is registered to the portable terminal that has been authenticated.

9. The content display system according to claim 1, wherein a web page transmitted from outside the system is displayed on the portable terminal, and a login operation of the user is accepted at the portable terminal.

10. A content displaying method of causing a display device installed at a predetermined location to display a predetermined content, the method causing one or more processors to carry out:
    causing the display device to display first content;
    acquiring second content based on an operation on a portable terminal by a user when the first content is displayed on the display device;
    accepting a setting operation corresponding to the second content from the user via the portable terminal;
    causing the display device to display the second content while the first content is being displayed on the display device; and
    accepting from the user an operation to select the second content, an operation to select the display device for displaying the second content, and an operation to set a schedule for displaying the second content.

\* \* \* \* \*